July 20, 1965
E. L. LUSTENADER
3,196,087
WATER DEMINERALIZING APPARATUS
Filed March 28, 1961
2 Sheets-Sheet 1
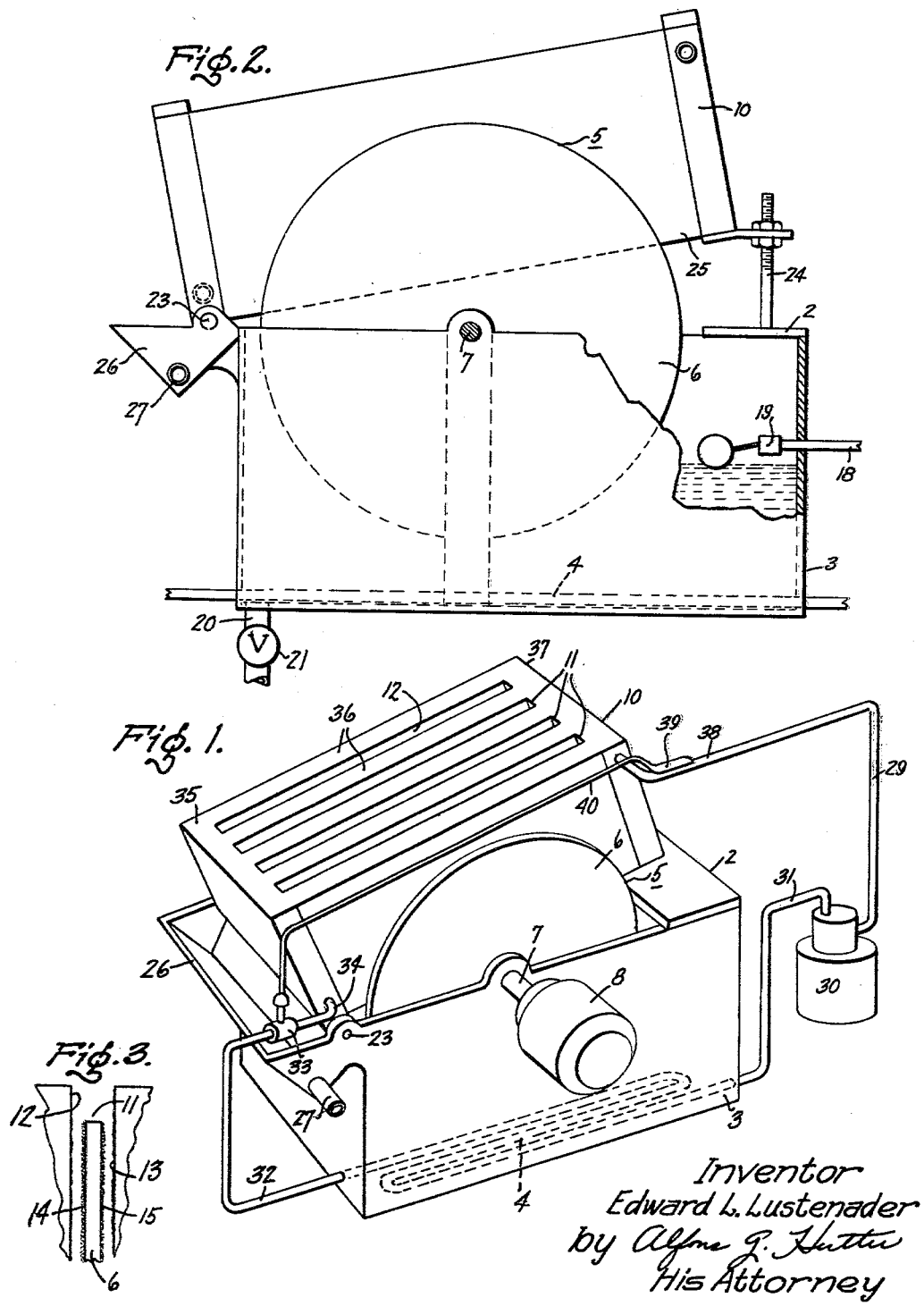
Inventor
Edward L. Lustenader
by Alfred G. Hutter
His Attorney July 20, 1965  E. L. LUSTENADER  3,196,087
WATER DEMINERALIZING APPARATUS
Filed March 28, 1961  2 Sheets-Sheet 2
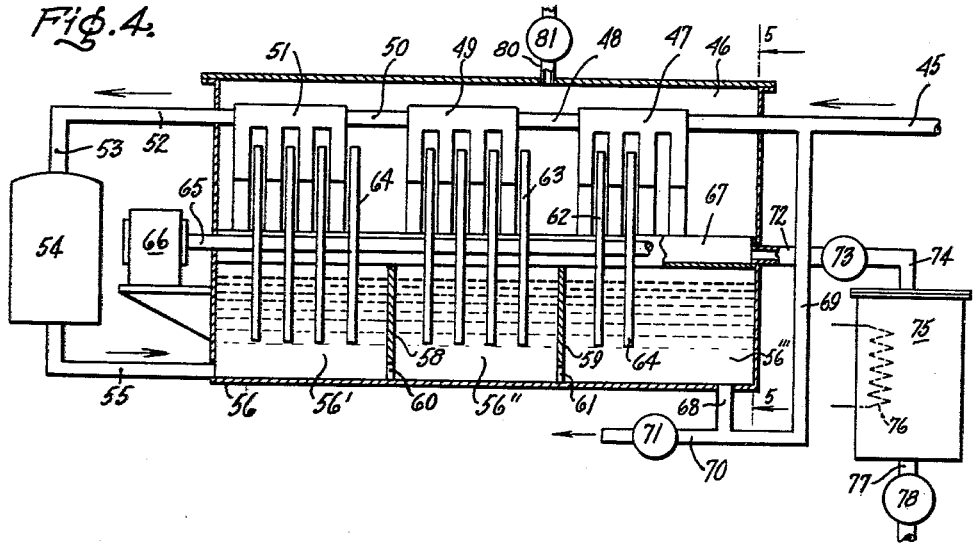
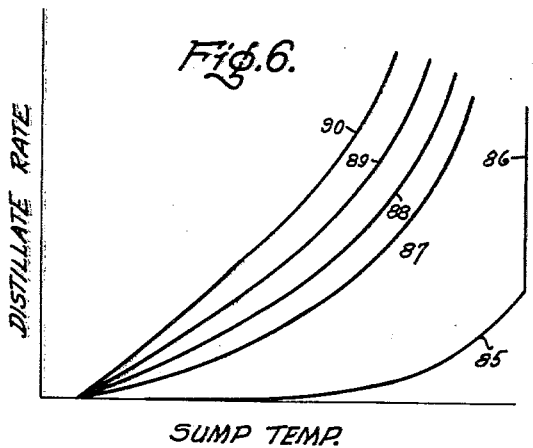
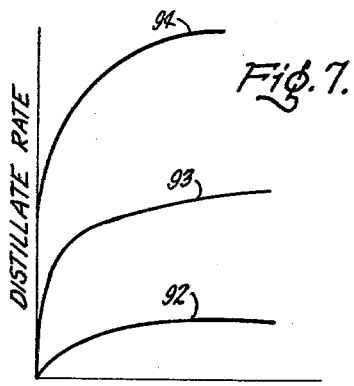
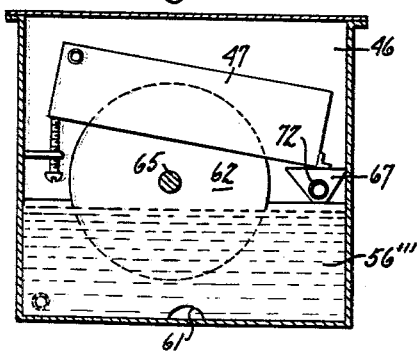
Inventor
Edward L. Lustenader
by Alfons J. Hutter
His Attorney

United States Patent Office 3,196,087
Patented July 20, 1965

3,196,087
WATER DEMINERALIZING APPARATUS
Edward L. Lustenader, Scotia, N.Y., assignor to General
Electric Company, a corporation of New York
Filed Mar. 28, 1961, Ser. No. 98,842
2 Claims. (Cl. 202—236)

The present invention relates to an apparatus for demineralizing water, and more particularly, to an apparatus for demineralizing water for use in household water softening devices.

Presently, the most common type of apparatus available for treating water for household use is limited to chemically removing from hard water certain select salts or minerals such as calcium carbonate and magnesium carbonate. Usually, the calcium and magnesium ion removal is effected by means of an ion exchange process, thereby improving the washing properties of soaps and detergents in the water.

The limited usefulness of chemical water softeners of the type described is apparent. The device is limited to use with potable water, and further, the chemical treatment is effective only in areas where specific minerals are present in the water. These shortcomings in presently utilized water softening devices indicate the need for an apparatus of broader usefulness, for example, in treating a broader range of impurities in the water and, more desirable, to render brackish and saline water potable.

In the copending application of Dale H. Brown, Edward L. Lustenader, and Franz J. Neugebauer entitled, "Method and Apparatus for Demineralizing Water," Serial No. 44,147, filed July 26, 1960 and now abandoned, and assigned to the assignee of the present application, there is described a process for rendering brackish and saline water potable wherein distilland is passed over an evaporating surface located adjacent a second heat exchange surface at a lower temperature. Distilland on the first surface evaporates therefrom and diffuses through the space between the surfaces toward the second surface, the vapor condensing on the second surface and being collected for use. In rendering water potable according to the teaching of the above identified patent application, it has been found that the diffusion rate increases as the space between the evaporating and condensing surfaces decreases. The proximity of these surfaces is limited by the flowing characteristics of distilland on the evaporating surface. It will be appreciated that any splashing of distilland from the evaporating surface onto the condensing surface tends to contaminate the product and limit the usefulness of the apparatus. This possibility of product contamination indicates a need for a discreet distance between the evaporating and condensing surfaces. Another necessary provision in practicing the teaching of the Brown, Lustenader, and Neugebauer application is that the evaporating surfaces be maintained substantially free of scale for high heat transfer to maintain a desired diffusion rate.

The chief object of the present invention is to provide an improved apparatus for rendering saline and brackish water potable.

An object of the invention is to provide an improved apparatus for demineralizing water which is not harmfully affecting by scaling.

Another object of the invention is to provide an improved household water softener.

A further object of the invention is to provide an improved water demineralizing apparatus wherein distilland is not heated through a heat exchange surface.

A still further object of the invention is to provide an improved apparatus for demineralizing water wherein evaporation and condensation occur at atmospheric pressure.

Another object of the invention is to provide an apparatus for demineralizing water wherein the evaporating surface has associated therewith improved means for applying a film of water thereto to permit close proximity between the evaporating and condensing surfaces of the apparatus.

These and other objects of my invention will become more apparent from the following description.

Briefly stated, the present invention relates to an apparatus for demineralizing water wherein a pair of spaced surfaces maintained at different temperatures includes a movable surface which passes through a sump filled with distilland, the movable surface moving in close proximity to the cooler surface whereby a portion of the distilland evaporates diffusing through the space therebetween and condensing on the cooler surface from whence the liquid is collected for use.

The attached drawings illustrate preferred embodiments of the invention, in which:

FIGURE 1 is a perspective view of an apparatus for practicing the present invention;

FIGURE 2 is an end view, partially in section, of the apparatus shown in FIGURE 1;

FIGURE 3 is an enlarged fragmentary view showing the diffusion action occurring at the evaporating and condensing surfaces of the apparatus illustrated in FIGURES 1 and 2;

FIGURE 4 is a sectional view of another embodiment of the apparatus shown in FIGURE 1;

FIGURE 5 is a sectional view of the apparatus shown in FIGURE 4 taken along the line 5—5;

FIGURE 6 is a diagram plotting distilling rate vs. temperature of water in the sump for the apparatus shown in FIGURE 1; and, FIGURE 7 is a diagram plotting distilling rate vs. rotor speed for the apparatus shown in FIGURE 1.

In FIGURE 1 there is shown an apparatus for practicing the present invention which comprises base 2 which includes a sump portion 3 having located therein a suitable heat exchanger 4 adapted to supply sensible heat to distilland in sump 3. Rotor 5 rotatably mounted in base 2 above sump 3, includes a plurality of parallel discs 6 mounted upon shaft 7 which is connected to motor 8. Rotation of discs 6 causes a portion of each disc to continually pass through distilland in sump 3 thereby placing a distilland film on the disc surfaces.

Heat exchanger 10 is mounted about sump 3 and includes a plurality of openings 11, each opening being defined by parallel surfaces 12 and 13. These openings present surfaces located adjacent the surfaces of discs 6 which as previously noted are adapted to have films of heated distilland present thereon.

FIGURE 2 is an end view of the apparatus shown in FIGURE 1 with a portion of one side in section. Distilland may be supplied through line 18 to a suitable float actuated valve 19 which maintains a desired level of distilland in sump 3. In this view it can be seen that shaft 7 of rotor 5 is mounted on a bearing located on the end of base 2 of the apparatus. It is also noted that heat exchanger 10 which is adapted to be at a lower temperature than the distilland in the sump is slightly tilted by being mounted on base 2 at pivot point 23 located adjacent trough 26 and on a stud 24 on the opposite side of the base. By this construction, lower surface 25 of heat exchanger 10 is inclined in a direction toward trough 26 which has a discharge opening 27 (also shown in FIGURE 1).

In the present embodiment, sump 3 and condensing surfaces 12 and 13 of heat exchanger 10 are vented to the atmosphere. The entire heat exchange process in this embodiment is performed in the presence of the non-condensible gases in the atmosphere.

In FIGURE 3 there is shown an enlarged view of a portion of one of the discs 6 and the adjacent portions of heat exchanger 10. In this view, flat surfaces 14 and 15 of disc 6, which are preferably wettable surfaces, have a film of distilland thereon and are spaced from cool surfaces 12 and 13 of heat exchanger 10 upon which condensate is deposited in the form of a film. The migration of distillate vapor from surfaces 14 and 15 to surfaces 13 and 12 is by a process of diffusion wherein the driving force for mass transfer is the partial pressure gradient from the hot distilland liquid to the cooler distillate liquid. The partially evaporated distilland (distillate vapor) is condensed on surfaces 12 and 13 as a result of the lower temperature of the surfaces. This migration of distillate vapor from the distilland film on the discs to the condensing surfaces is performed in a manner similar to that outlined in the copending application of Dale H. Brown, Edward L. Lustenader, and Franz J. Neugebauer.

From the embodiment of the invention shown in FIGURES 1 and 2 it is apparent that it is necessary to maintain the distilland in sump 3 at a temperature higher than the temperature of the surfaces of heat exchanger 10. In this particular embodiment, a refrigeration circuit 29 is utilized to perform this function. Refrigeration circuit 29 may comprise a suitable compressor 30 which discharges gaseous refrigerant through hot gas line 31 into heat exchanger 4 which comprises the condenser portion of the particular refrigeration system. The condensed refrigerant liquid is then discharged through liquid line 32 to expansion means 33, through line 34 into heat exchanger 10 which may comprise the evaporator portion of the refrigeration system. Heat exchanger 10 may comprise an inlet manifold 35 connected to an outlet manifold 37 by means of a plurality of parallel conduit portions 36 which define the wall surfaces 12 and 13 mentioned in the description of the construction in FIGURE 3. Gaseous refrigerant is discharged from heat exchanger 10 through suction line 38 and returned to compressor 30. The expansion means 33 shown in FIGURE 1 is a thermal expansion valve which is actuated by thermal responsive bulb 39 mounted on the suction line, bulb 39 being connnected to the thermal expansion valve by capillary line 40.

In the operation of the apparatus shown in FIGURES 1, 2, and 3, distilland such as hard or saline water may be supplied through line 18 shown in FIGURE 2 to float actuated valve 19 which maintains a desired level of distilland in sump 3. The distilland in sump 23 may be heated by the condenser portion (heat exchanger 4) of refrigeration circuit 29 so that the distilland is maintained at a desired temperature, for example, in the area of 180° F. Discs 6 which comprise a portion of rotor 5 are slowly rotated at a speed, for example, between 5 and 50 r.p.m. (revolutions per minute), so that portions of the discs continuously pass through the heated distilland in the sump to form a thin film of distilland thereon. The wetted sections of the discs are moved from the distilland in the sump and pass adjacent the surfaces of heat exchanger 10 in a manner that the surfaces of the discs and the adjacent portions of the heat exchanger (surfaces 12 and 13) are spaced a distance approximately ⅛ inch. Because of the partial pressure gradient between the heated distilland, a portion of which evaporates and is diffused, and the condensing surfaces of heat exchanger 10, a film of distillate liquid condenses on the surfaces 12 and 13 of heat exchanger 10. If desired, the evaporating heat exchanger 10 may be maintained at a temperature, for example, 10 degrees or lower,, than the temperature of the distilland in the sump. It will be noted that this process of diffusion takes place in the presence of air and evaporation occurs due to the partial pressure gradient previously mentioned.

The film, as shown in FIGURE 3, which forms on surfaces 12 and 13 passes by gravity downwardly along the surfaces until edge 25 shown in FIGURE 2 is reached. Because of the slope of edge 25, distillate liquid passes to the left toward trough 26 and eventually passes into the trough and is discharged therefrom through line 27 from the apparatus for use.

The distilland which is not evaporated from the surface of discs 6, that is, distilland remaining on surfaces 14 and 15 is returned to the sump where the concentration of the distilland may increase. It is desirable that this concentration of distilland be maintained at a low level and to achieve this, discharge line 20 having a suitable valve 21 which is intermittently actuated bleeds a portion of the concentrated distilland from the sump and thereby maintains a desirable level of distilland concentration in the sump.

In FIGURE 4 there is shown another embodiment of the invention having particular use in household distillation apparatus wherein it is desired to supply demineralized water at a desired pressure and temperature level for use in a household. In this particular embodiment, the distilland which may be brackish water or potable water having a high concentration of minerals is supplied through line 45 into a closed chamber 46 in which are located series connected heat exchangers 47, 49, and 51 which may be similar in construction to heat exchanger 10 shown in FIGURES 1 and 2. The distilland is supplied first to heat exchanger 47 and through line 48 to heat exchanger 49. Heat exchanger 49 is connected through line 50 to heat exchanger 51. Each of these heat exchangers 47, 49, and 51 is associated with groups of discs 62, 63, and 64 which are mounted on shaft 65 and rotated at a low speed by motor 66. The purpose of this particular orientation of heat exchangers and groups of discs is to create a plurality of temperature drops in the heat exchangers and in the sump so that a multiple effect may be achieved in such a manner as to approximate the usual advantage of a counterflow heat exchanger. In this particular embodiment as shown in FIGURE 4, feed water is progressively heated as it passes through the succession of heat exchangers 47, 49, and 51 and is discharged through lines 52 and 53 into suitable heating means 54 which may comprise a boiler wherein the water is heated to a desired level. The heated liquid is passed through line 55 into the sump 56. In this embodiment, because of the plurality of groups of discs, the sump may be divided into a plurality of sections 56′, 56″, 56‴ defined by partitions 58 and 59 in such a manner that sump section 56′ is in communication with section 56″ by means of opening 60 and sump section 56″ is connected to sump section 56‴ by means of opening 61. As liquid is introduced from line 55 into sump section 56′, the heat of evaporation is removed from the liquid and a diffusion process similar to that outlined with respect to the apparatus in FIGURES 1 and 2 occurs. The temperature of the distilland may be decreased and the distilland may be passed through opening 60 into sump section 56″ where the temperature of the distilland is again decreased by being in heat exchange relation with the liquid in heat exchanger 49. The lower temperature distilland is passed into sump section 56‴ where the distilland is in heat exchange relation with heat exchanger 47. The lower temperature distilland is then discharged from chamber 46 through line 68. A portion of the concentrated distilland is passed through line 70 and valve 71 for the purpose of bleed-off in a manner to maintain a desired saline concentration in the distilland. The remaining distilland is returned or recirculated through line 69 to supply line 45.

The distilland on the discs which are partially diffused through the spaces between the discs and the surfaces of heat exchangers 47, 49, and 51 forms condensing films thereon which pass by surface tension along the bottom edge of the heat exchangers into trough 67 (also shown in FIG. 5). The distillate formed on the heat exchangers is collected in trough 67 and is discharged through outlet line 72 to valve 73 which controls its passage through line 74 to the storage tank 75. Storage tank 75 may be the hot water heater in a home. In order to maintain the temperature of the stored water, a suitable heating element 76 may be provided. The water which is to be caused may be discharged from storage tank 75 through line 77 and valve 78.

In the embodiment of the invention shown in FIGURE 4 there is illustrated an apparatus for use in households as a combination water treatment apparatus and water heater. In the embodiment of FIGURE 4 means other than a refrigeration circuit are utilized to heat the distilland and the condensing surfaces are cooled by the incoming water which may be at a temperature of 55° F. and a pressure of 60 lbs. per square inch. The water, after its temperature is utilized for condensing purposes, is heated and passed into the sump where the distilland may be evaporated to form distillate liquid which may be supplied to storage tank 75.

In the apparatus shown in FIGURE 1 the pressure of the distillate may be substantially atmospheric pressure and may not be utilized in a household without separate pumping means for passing the product through the particular plumbing arrangement within the home. In the embodiment in FIGURE 4 chamber 46 may be at a pressure slightly less than the incoming distilland pressure which as previously noted may be 60 lbs. per square inch. For this purpose, a suitable air pump 81 may be associated with line 80 connected to chamber 46. This pump may maintain the pressure of the chamber at slightly less than distilland supply pressure, for example, 50 lbs. per square inch. In this manner, the distilland which has been evaporated, condensed, and collected in trough 67 is subjected to the 50 lbs. pressure which will propel it through lines 72 and 74 into the storage tank to maintain the liquid in the storage tank at 50 lbs. pressure for supply to the plumbing system of the home. The apparatus shown in FIGURE 4 may also function so that the boiler may have a discharge temperature whereby distillate being condensed may be in the area of 180° F. or other temperature at which the distillate is to be used so that the heating effort required in the storage tank 75 is only to maintain the temperature of the distillate supplied thereto.

FIGURE 6 is a diagram plotting distillate rate vs. sump temperature for the apparatus in FIGURE 1. Curve 85 indicates the distillate rate at various temperatures when the discs in the apparatus are not rotated. Curve 85 shows that at a temperature of 212° F. (line 86) since the air is substantially removed from the apparatus by the increase in pressure there will be a rapid increase in distillate-forming rate. This increase in distillate forming is due to the high pressure acting as a purge for non-condensible gases. Curve 87 indicates a rise in distillate rate at lower temperatures when the discs are rotated at approximately 5 r.p.m.

Curve 88 shows the increase achieved by increasing the disc rotation rate to 20 r.p.m. Curves 85, 87, and 88 result from spacings between the disc surfaces and the condensing surfaces of approximately 1/8 inch. Curves 89 and 90 show improved distillate-forming rates at speeds of 5 r.p.m. and 20 r.p.m., respectively, by closing the space between the discs and the condensing surfaces to 1/2 the former value or to 1/16 inch. From the curves in FIGURE 6, it can be seen that by rotating the discs at an extremely low speed, a great increase in distillate-forming rate may be achieved and this rate may be increased by decreasing the spacing between the film of distilland and the condensing surface, the ability to bring the surfaces in close proximity being a direct result of the manner in which the distilland film is applied.

FIGURE 7 is a diagram plotting distillate rate vs. disc speed. Curve 92 indicates the distillate rate for a temperature level of approximately 100° F. It is noted that by increasing the temperature to 170° F., as shown by curve 93, the distillate rate is increased substantially and more so by increasing the temperature to approximately 200° F. (curve 94).

The present invention as described provides an apparatus which may inexpensively supply distillate having high purity without requiring pressure vessels with extensive systems for purging non-condensible gases. The power consumption of the apparatus is small since the rotation of the rotor is extremely slow. Furthermore, apparatus is also supplied which may operate under pressure conditions to provide distillate with substantial supply pressure. Further, if desired, the distillate-forming rate may be greatly increased in the embodiment in FIGURE 4 by utilizing the pumping apparatus as a purge thereby removing non-condensible gases and permitting the apparatus to operate at a steam pressure slightly less than the supply pressure of raw distilland supplied thereto.

The present invention demonstrates the improved performance which may be achieved by the slowly rotating discs in operating a diffusion-type still. The present invention also provides an apparatus wherein the distilland is supplied to the surface from which evaporation results in a manner that permits extremely close spacing between the evaporating surface and the condensing surface to achieve high diffusion rates. Furthermore, the previously encountered difficulties wherein scale forms on the evaporating surface no longer harmfully affects the operating characteristics of the apparatus because heat transfer is not through a surface.

While I have described a preferred embodiment of the invention, it will be understood that the invention is not limited thereto since it may be otherwise embodied within the scope of the appended claims.

What I claim as new and desire to secure by Letters Patent of the United States is:

1. In an apparatus for demineralizing water, the combination of means defining a chamber, a plurality of surfaces located in said chamber, means for cooling said surfaces, a plurality of rotatable discs, each disc having a surface adapted to be adjacent a cooled surface, means defining a sump, means for supplying distilland to said sump at a predetermined pressure, means for heating the distilland supplied to the sump, means for rotating the discs through the distilland in the sump whereby a distilland film forms on the discs, said distilland evaporating from the surface of the discs and diffusing through the space between the discs and the cooled surfaces and condensing on the cooled surfaces, means for collecting the condensate from the cooling surfaces, means for maintaining the pressure of the chamber greater than atmospheric pressure and less than the distilland supply pressure to supply the condensate from the chamber at a pressure greater than atmospheric pressure.

2. The apparatus according to claim 1 further comprising storage means for maintaining the condensate from the chamber at the desired pressure and means for heating the condensate in the storage means.

References Cited by the Examiner

UNITED STATES PATENTS

| | | |
|---|---|---|
| 2,025,724 | 12/35 | Clendenin. |
| 2,073,327 | 3/37 | Vigers _____ 202—64 |
| 2,180,050 | 11/39 | Hickman _____ 202—236 |
| 2,210,928 | 8/40 | Hickman _____ 202—236 |
| 2,703,310 | 3/55 | Kretchmar _____ 202—236 X |
| 2,861,925 | 11/58 | Mende _____ 202—236 X |
| 2,946,204 | 7/60 | Justice _____ 62—238 |

NORMAN YUDKOFF, *Primary Examiner.*

GEORGE D. MITCHELL, ALPHONSO SULLIVAN, MILTON STERMAN, *Examiners.*